*INVENTORS*
Ronald Llewelyn GRIFFITH
Albert Louis PROMISLOW

United States Patent Office 3,621,711
Patented Nov. 23, 1971

3,621,711
APPARATUS FOR TESTING REINFORCED ELASTOMERIC STRUCTURES
Ronald L. Griffith and Albert L. Promislow, Kingston, Ontario, Canada, assignors to Canadian Industries Limited, Montreal, Quebec, Canada
Filed Feb. 16, 1970, Ser. No. 11,397
Claims priority, application Canada, Feb. 17, 1969, 43,189
Int. Cl. G01n 3/32
U.S. Cl. 73—100
6 Claims

ABSTRACT OF THE DISCLOSURE

An important apparatus for the testing of textile reinforced flexible structures by means of strain cycling. The apparatus permits the measurement of work input during strain cycling by taking account of the generation of energy in the form of heat. The dynamic modules of the textile reinforcement in the interior of the test sample may also be measured.

---

Figure 1:
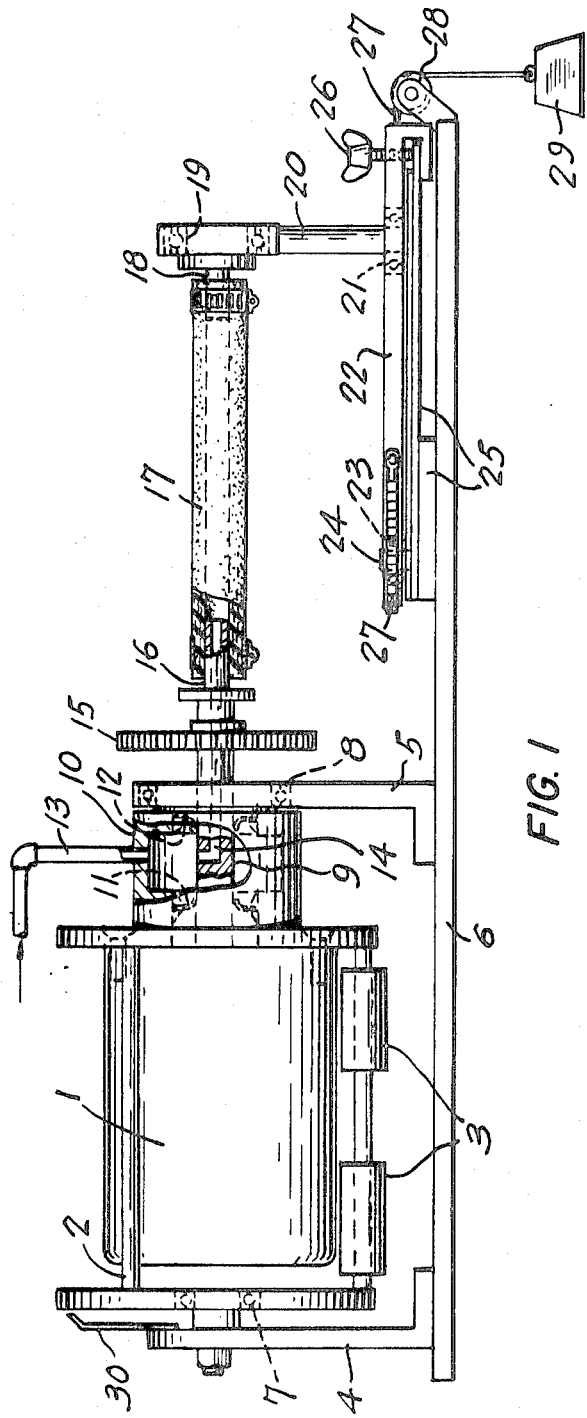

This invention relates to apparatus for testing flexible textile-reinforced structures. In particular, the invention pertains to measuring the energy dissipated in cord-reinforced rubber when subjected to cyclic straining. Most particularly, the invention is concerned with the testing of tire components.

The apparatus and methods for testing reinforced flexible structures disclosed heretofore in, for example, U.S. Pat. No. 2,235,622 issued Mar. 18, 1941 to F. Ray and U.S. Pat. 2,412,524 issued Dec. 10, 1946 to G. D. Mallory, have been directed to the measurement of a loss of cord strength after periods of strain cycling between fixed sample strains or to the measurement of useful life when a sample has been fatigued to the point of rupture. None of the earlier disclosed test methods or the apparatus adapted to perform the tests take account of the work loss or the work input which is reflected in the generation of energy in the form of heat resulting in the exposure of the test sample to high temperatures during the strain cycling period. It has now been recognized that the work loss in the form of the heat energy factor is one of the most important elements which contribute to the destruction of a reinforced rubber structure, particularly a tire, during periods of stress cycling. A second important factor now recognized in the testing of reinforced rubber structures is the relative measurement of the dynamic modulus of the textile reinforcement, for example, a tie cord, at temperatures obtaining in the interior of the sample. Additionally, the measurement of energy input and dynamic modulus during the testing period could be employed to establish if an equilibrium state exists during the period of strain cycling. Test methods employed heretofore fail to take account of the heat energy factor, the dynamic modulus of the reinforcing material or the determination of the establishment of any true state or equilibrium within the test sample.

It is an object of the present invention to provide a novel apparatus for the testing of textile-reinforced rubber structures.

It is a further object of the invention to provide a strain-cycling test method which permits measurement of the energy dissipated in a sample during testing.

Another object of the invention is to obtain a measure of the dynamic modulus of a textile reinforced assembly.

Yet another object of the invention is to provide a means whereby equilibrium conditions within a textile-reinforced test sample can be determined.

Other objects of the invention will be obvious from a consideration of the following disclosure and claims.

The present invention comprises apparatus for testing textile-reinforced resilient materials by:

(a) preparing a sample textile-reinforced rubber tube such as that described in ASTM Designation D885–64T,
(b) attaching one end of the sample tube to a rotation imparting means, for example, a fractional horsepower electric motor, which motor is itself freely rotatable and instrumented to measure the net turning torque applied by it to the tube,
(c) attaching the opposite end of the tube to a support means, which support means allows free rotation of the tube and by which the tube may be subjected to a fixed bending torque applied by a constant force or to a fixed deflection,
(d) inflating the tube with a fluid,
(e) rotating the tube by means of the rotation imparting means, and
(f) calculating the energy loss within the test sample.

Unlike the prior art procedures which only permitted dynamic fatigue testing under restricted conditions and the extraction of limited data, the method of the present invention permits the setting of the test under variable conditions and the extraction of a wide range of data. The test method of the present invention allows the deliberate alteration or adjustment of the tube deflection over a continuous interval and/or it allows the alteration of the deflecting moment applied to the tube over a continuous interval. Thus, the apparatus permits observation of changes in tube deflection arising from changes in cord characteristics during testing.

The work loss or work input converted to heat per revolution of the tube or per unit of time are measurable by the present method as are the units of torque required to rotate the tube.

Figure 2:
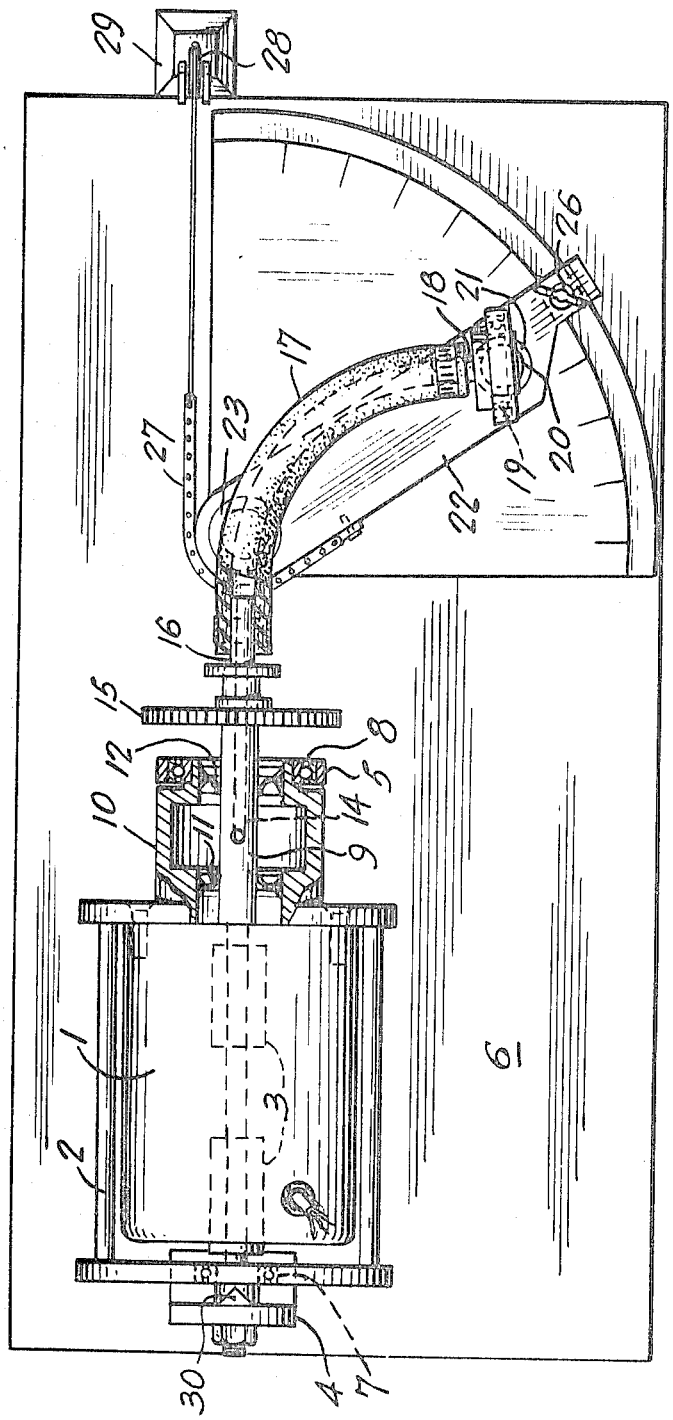
Figure 3:
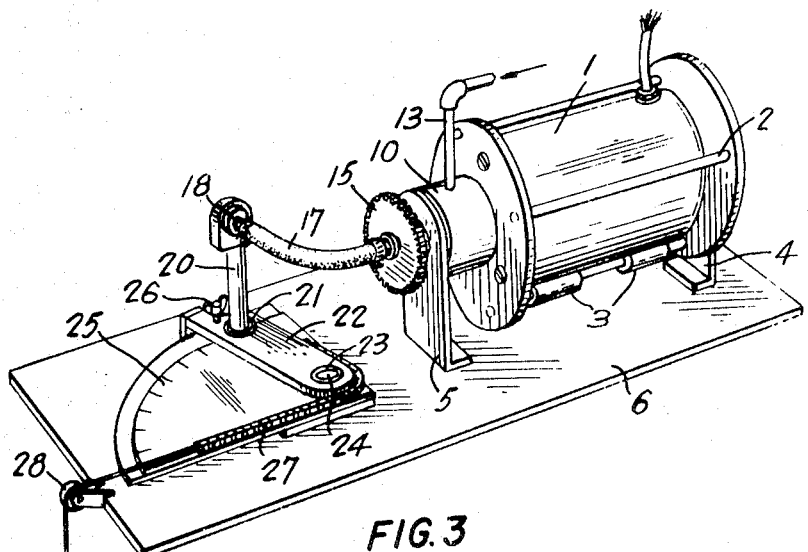
Figure 4:
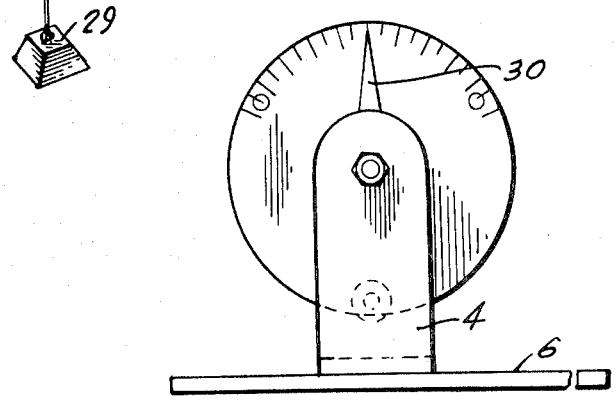

A fuller understanding of the present invention will be gained by referring to the accompanying drawing wherein:

FIG. 1 is a side elevational view partly cut away of the testing apparatus;
FIG. 2 is a plan view partly cut away of the apparatus of FIG. 1;
FIG. 3 is a perspective view of the apparatus of FIG. 1; and
FIG. 4 is an end view of the apparatus of FIG. 1.

Referring in detail to the figures of the drawing there is shown a fractional horsepower electric driving motor 1 rigidly retained in a motor cage 2, which cage has a counterweighted section 3. Motor cage 2 is held at each end thereof by supports 4 and 5 which supports are in turn fixed to base plate 6. Motor cage 2 and its fixed driving motor 1 is freely rotatable on bearings 7 and 8 which bearings are attached to supports 4 and 5 respectively. The driving motor shaft 9 passes through an air box 10 which air box is attached to motor cage 2. Gland seals 11 and 12 are provided in air box 10 to afford an air-tight closure around motor shaft 9. Air box 10 has a nipple opening 13 therein to permit the passage of air under pressure into air box 10. Motor shaft 9 has an axial channel 14 drilled through most of its length which axial hole is open into air box 10. Forward of air box 10 and attached to motor shaft 9 is a toothed wheel 15 by which means the rotational speed and the number of rotations of motor shaft 9 can be measured by employing a magnetic sensing head (not shown) and a digital counter (not shown). The extreme forward end of motor shaft 9 comprises a section of reduced diameter 16 to which one end of a tubular test specimen 17 may be attached.

The opposite end of test specimen 17 is attached to freely rotating idler 18 held by bearing 19 in idler support 20. Idler support 20 is rotatably mounted in bearing 21 on swing arm 22. Swing arm 22 in turn is movably mounted in bearing 23 on pivot 24. Pivot 24 is attached to pivot plate 25 which is fixed to base plate 6. Swing arm 22 has located at the end thereof a securing means 26 by which the position of swing arm 22 may be fixed in relation to pivot plate 25. Attached to swing arm 22 is a flexible cable or chain 27 which is passed over a pulley 28 and has attached at the end thereof a weight 29. Referring in particular to FIG. 4 there is shown the end face of motor cage 2 having scaled markings thereon. A pointer 30 is affixed to support 4 by which means the degree of any deflection of cage 2 may be determined.

The apparatus of the invention may, if desired, be employed as a conventional "fatigue-to-rupture" apparatus similar in function to that described by G. D. Mallory in U.S. Pat. No. 2,412,524 except that in the present apparatus, unlike that of Mallory, the degree of bend or deflection of the tube specimen may be altered over a wide range thus permitting a comparison of results for similar specimens tested under variable conditions. For purposes of the "Mallory" type test using the present apparatus the tube specimen 17 is prepared in a manner such as that specified by ASTM Designation D855–64T and connected by means of clamps to the reduced diameter section 16, of motor shaft 9 and to rotating idler 18. Air at, for example, 50 p.s.i. is passed from a source (not shown) through air box 10 and axial shaft channel 14 to inflate tube specimen 17 to simulate an inflated tire. Swing arm 22 may then be moved to any degree of angle up to 90° and set in the desired position by means of securing means 26 which means anchors arm 22 to pivot plate 25. Actuation of driving motor 1 causes specimen 17 to rotate about its bent axis which rotation is continued until tube rupture results. The speed of rotation may be adjusted by means of rheostatic control of electric driving motor 1 and the speed and number of tube rotations may be measured by magnetic sensing means from toothed wheel 15. The test may be repeated using different angles of bend of tube specimen 17 and a comparison of tube life made for a range of angles. Thus the severity of the test may be readily altered and the results obtained will permit the subsequent construction of fibre-reinforced rubber structures for specific end-use purposes where optimum fatigue characteristics are desired.

More importantly, the apparatus of the invention permits its use in a method for measuring the dynamic modulus of a fibre- or cord-reinforced rubber assembly at temperatures obtaining in the interior of the sample. As mentioned hereinbefore, one of the most important factors contributing to the destruction of a cord-reinforced test sample (which simulates, for example, a tire) during strain cycling is the generation of energy in the form of heat. Neither the heat energy factor or the measurement of the dynamic modulus of the cord within the specimen are determinable by existing "Mallory" type test methods. For purposes of these determinations a tube specimen 17 prepared in a manner such as that specified by ASTM Designation D855–64T is connected to small diameter section 16 of motor shaft 9 and to rotating idler 18. The specimen is inflated to, for example, 50 p.s.i. with air entering through air box 10 and shaft channel 14. Unlike the aforedescribed "Mallory" type test procedure, the tube specimen 17 is not bent through a fixed angle but rather the tube 17 is subjected to a fixed bending torque applied by a constant force by means of weight 29 acting through chain or cable 27, which is attached to swing arm 22. Weight 29 and its connecting cable 27 causes tube specimen 17 to bend either more or less depending on the dynamic modulus of the reinforcing cords within the specimen. The tube 17 is rotated about its bent axis by means of driving motor 1 the speed of rotation being measured from toothed wheel 15 and a magnetic sensing means. As the work done on tube specimen 17 takes the form of a torque applied to tube 17 by motor shaft 9 a reverse torque in reaction to the motor induced torque causes freely rotatable motor cage 2 to deflect in a direction opposite to the direction of rotation of motor shaft 9. The amount of reverse torque applied to motor cage 2 may be determined by measuring the angle through which cage 2 is deflected from its equilibrium against the restraining action of counterweight 3 by noting the movement of cage 2 at pointer 3 affixed to support 4. From the rotational speed of motor shaft 9 and the measured torque, the energy or work input to the tube converted to heat per revolution or per unit of time may be calculated. The torque units required to rotate tube specimen 17 about its bent axis are equivalent to the units of work or energy performed to rotate the tube one revolution. Such units of energy may be employed to describe the hysteresis loss per cycle which occurs in the compression and stretch cycling to which the tube 17 is subjected. For example, dyne-cm., gm.-cm. or ergs may be employed as units of measure and may refer either to torque required to rotate tube 17 or the work loss per revolution of tube 17. By multiplication of the torque or the work loss per revolution by the revolutions per unit of time, a power loss value may be obtained. Such power loss figure, which may be expressed in watts, may be compared for various tube samples, of different construction.

By way of example of the above calculation, a test specimen A was found to cause a deflection of 31° from observation of pointer 30 against the scale on cage 2. Prior calibration of the instrument shows that this represents an input torque of 2857 gm.-cm. The rotational speed of motor 1 and shaft 9 was set at 1000 r.p.m. Hence:

$$\text{Power loss per second} = \text{torque} \times \text{speed} \times 2\pi$$
$$= 2857 \times \frac{1000}{60} \times 2\pi$$
$$= 2.99 \times 10^5 \text{ gm.-cm./sec.}$$

This result may be converted to watts by multiplying by the appropriate conversion factor. Therefore, $$\text{Power loss} = 2.99 \times 10^5 \times 9.806 \times 10^{-5}$$
$$= 29.3 \text{ watts}$$

Since the speed of rotation of motor 1 may be rheostatically controlled, this speed is also continuously adjustable over the range of interest and permits the measurement of all the parameters of the rubber/cord relationship, that is, the dynamic modulus and the energy loss or hysteresis loss is determinable as a function of the adjustable variables, namely, tube deflection, applied torque, time and rotational speed. A wide range of test conditions can therefore be set. The apparatus and method of the invention allows the determination of information which heretofore has not been possible employing the standard "Mallory" type test procedures. For example, it has been observed using the standard "Mallory" test that nylon cord reinforced rubber tubes generally operated longer (did not rupture) than did polyester cord reinforced tubes. This was the only observable result employing the "Mallory" test technique. The apparatus and method of the present invention however, permits the observation that for a given applied torque, a polyester reinforced tube, for example, deflects less and has a lower energy loss on rotation (i.e. generates less heat) than does a nylon reinforced tube. Additionally it can be observed that specimens of various constructions may reach a period of sudden and rapid deterioration during the stress cycling period and this range of transition may be accurately established by means of the method and apparatus of the invention. Furthermore, observation of the specimens during the testing period can establish if a true state of equilibrium is achieved.

Continuous measurement of energy input or power loss and the dynamic modulus of the specimen can be made throughout the period of test. It can be shown, for example, that for certain combinations of cord type/structure/ rubber samples no such state of equilibrium exists although the sample may require long periods of strain cycling to build up sufficient heat to cause failure. This type of behaviour cannot be detected by fatigue test methods employed heretofore.

Thus the manufacturer of, for example, tires may modify reinforcing cord treating conditions, adhesives, cord structure and type, rubber composition and the like and make accurate evaluation of each modification in the performance of the resultant products through the use of the method and apparatus of the invention.

What we claim is:

1. An apparatus for the testing of textile-reinforced flexible tubular structures comprising:
   (a) a stationary base structure,
   (b) a rotation imparting member and a rotatable support member resting on said base structure,
   (c) means for hermetically fixing a textile-reinforced flexible tubular structure between said rotation imparting member and said rotatable support member,
   (d) means for introducing fluid pressure into said flexible structure,
   (e) means for bending said flexible structure between said rotation imparting member and said rotatable support member,
   (f) means for measuring the speed and number of rotations of said flexible structure during rotation about its bent axis, and
   (g) indicator means whereby any reverse torque resulting from the rotation of said flexible structure may be measured.

2. An apparatus as claimed in claim 1 wherein the said rotation imparting member comprises a drive motor mounted upon a supporting frame, said drive motor being maintained in freely rotatable relationship with respect to said supporting frame.

3. An apparatus as claimed in claim 2 wherein the said drive motor comprises a fractional horsepower electric motor.

4. An apparatus as claimed in claim 1 wherein the said rotatable support member is movable in a horizontal plane with respect to said rotation imparting member so as to provide a bending deflection to said hermetically fixed flexible structure.

5. An apparatus as claimed in claim 1 wherein said reverse torque indicating means comprises a pointer affixed to said stationary base structure.

6. An apparatus as claimed in claim 1 wherein the fluid is a gas.

References Cited

UNITED STATES PATENTS

| | | | |
|---|---|---|---|
| 1,512,063 | 10/1924 | Sproull | 73—100 X |
| 2,235,622 | 3/1941 | Ray | 73—91 X |
| 2,412,524 | 12/1946 | Mallory | 73—91 |
| 2,657,573 | 11/1953 | Castricum | 73—91 X |
| 2,761,310 | 9/1956 | Siegel | 73—15.6 |

CHARLES A. RUEHL, Primary Examiner

U.S. Cl. X.R.

73—91